Patented Nov. 17, 1925.

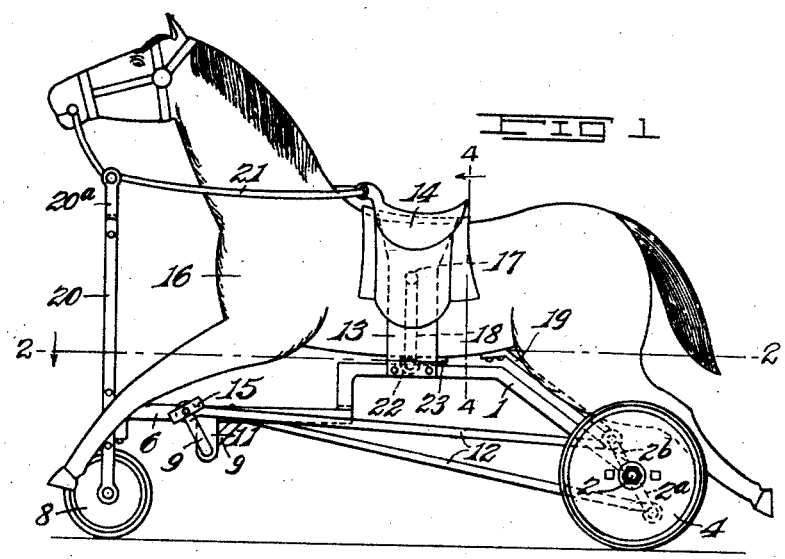

1,561,538

UNITED STATES PATENT OFFICE.

ELMER HOFF, OF WHEELING, WEST VIRGINIA.

VELOCIPEDE.

Application filed October 28, 1924. Serial No. 746,322.

*To all whom it may concern:*

Be it known that I, ELMER HOFF, a citizen of the United States of America, and resident of Wheeling, county of Ohio, and State of West Virginia, have invented certain new and useful Improvements in Velocipedes, of which the following is a specification.

This invention relates broadly to vehicles of velocipede type, and it has for its primary object to provide a child's wheeled vehicle adapted to be propelled as a velocipede and embodying in its construction a hobby horse which is actuated to rock as the vehicle is propelled.

A further object of the invention is to provide a structure of the character mentioned in which the saddle remains stationary while the horse is being rocked, thus avoiding the communication to the rider seated in said saddle of the rocking movements of the horse.

In describing the invention in detail, reference is herein had to the accompanying drawings, in which—

Figure 1 is a side elevation of the invention;

Figure 2 is a sectional plan of the vehicle running gear, the section being taken substantially on line 2—2, Fig. 1.

Figure 3 is a front elevation of the steering frame; and—

Figure 4 is a section on line 4—4, Fig. 1.

Referring to said drawings, the reference numeral 1 indicates each of two oppositely disposed frame members which are mounted upon a rear axle 2 adjacent to the opposite ends of the latter, said axle being mounted upon wheels 3 and 4 of which at least one, as the wheel 4, is fixed against rotation relative to said axle. The front ends of the members 1 are rigidly connected, as by transverse meeting members 5, which are rigidly carried upon the rear end of a forwardly extending bar or bars 6 which have swivel connection at their front ends with a steering frame, being mounted upon a pivot-bolt 7 carried by said steering frame, which latter is, in turn, mounted upon a guide wheel 8.

Pedal cranks 9 are carried by the opposite ends of a rod or shaft 10 which is suitably journaled for rotation, as in downwardly turned lips 11ᵃ formed on the opposite ends of a bar 11 which is rigidly mounted intermediate its ends upon the bar or bars 6, as shown.

The pedal cranks 9 are connected by connecting rods 12 to cranks 2ᵃ formed in the rear axle 2, so that rotary movement of said pedal cranks is communicated to said axle cranks for propelling the described structure. To provide for the employment of relatively small cranks 2ᵃ in the axle, the pedal cranks 9 of greater radius have a reciprocating movement throughout the arc of a circle rather than movement throughout a complete revolution.

A metal support 13 of substantially U-shape, inverted, has its opposite ends rigidly mounted upon suitable parts of the vehicle running gear hereinbefore described, as upon the opposite frame members 1, and superposed on the top of said support is a saddle 14 for the rider. As is manifest, the relative locations of the saddle 14 and the pedals 15 borne by the pedal cranks 9 are such that the latter may be readily reached and operated by the feet of the rider seated in said saddle.

Located within the embrace of the support 13, or between the substantially parallel side portions of said support, is the middle part of the body of a hobby horse 16 which is pivotally mounted upon said support, opposite outwardly directed pivot pins 17 rigidly carried by said horse-body being mounted for rotary movement in said parallel side portions of said support. As herein shown, said pins 17 are carried by the opposite ends of a metal rod 18 of substantially U-shape which extends downward and under the belly portion of the horse-body, as shown in Fig. 4, the transverse portion of said rod being loosely received by and having rotary bearing-like movement in a tubular knuckle 22 carried by a metal plate 23 which is rigidly attached to the under part of said belly portion. Said horse body, when occupying normal horizontal position, is spaced from the topmost portion of the support 13 such a distance that the rocking movements of the body produced in the manner hereinafter described are not interfered with by the support.

Rigidly attached to the under rear part of the belly portion of the horse body is the forward end of a downwardly and rearwardly inclined bar or member 19 which connects at its opposite end to a crank 2ᵇ formed in the axle 2 intermediate the cranks 2ª. Thus, as the vehicle travels, positive rocking movements are imparted to the horse body through said crank 2ᵇ and the member 19, said body swinging on the pivot-pins 17 relative to the running gear and the support 13, and also rocking relative to its supporting rod 18.

The steering frame 20, which may have any appropriate structural formation, embodies opposite arms 20ª and straps 21, as shown in Fig. 1, simulating the reins of a bridle which extend rearwardly and serve as means by which the steering frame may be turned on the pivot-bolt 7 for steering the course of travel of the vehicle.

The rider, seated on the saddle 14, propels the vehicle by force applied to the alternate pedals 15 in a manner more or less common to the propulsion of velocipedes. Travel of the vehicle effects, through the axle crank 2ᵇ and member 19, rocking movement of the horse.

Since the saddle remains stationary, the equilibrium of the rider is in no wise disturbed by the rocking movements of the horse. The rider is therefore enabled to devote the requisite energy to the driving of the vehicle unaffected by rocking movements which would otherwise prove disconcerting.

What is claimed is—

1. In combination, a vehicle running-gear, a rocking horse mounted over and supported by said running gear, means whereby travel of said running gear induces rocking movement of said horse, and a stationary rider's seat carried by said running gear independently of and at a distance from the back of the horse permitting unobstructed rocking movement of the horse.

2. In combination a vehicle running gear comprising a frame and a rear axle having cranks therein, pedal cranks mounted on said frame, connecting rods joining said pedal cranks to cranks of said axle, a rocking horse pivotally mounted upon said frame, a member attached to said horse having connection with a crank of said axle whereby rotation of said crank imparts rocking movement to said horse, and a stationary rider's seat supported by said frame in an elevated position with respect to said horse.

3. In combination a vehicle running gear comprising a frame and a rear axle having cranks therein, pedal cranks mounted on said frame, connecting rods joining said pedal cranks to cranks of said axle, an upright support carried by said frame, a rocking horse pivotally mounted upon said support, means intermediate one of the cranks of the axle and said horse whereby rotation of the former actuates rocking movements of the latter, and a rider's saddle stationarily mounted upon said support above and independent of said horse.

4. In combination a vehicle running gear comprising a frame and a rear axle having cranks therein, pedal cranks mounted on said frame, connecting rods joining said pedal cranks to cranks of said axle, a fixed upright support of inverted U-shape carried by said frame, a rocking horse pivotally carried intermediate the side members of said support, means intermediate an axle crank and said horse whereby rotation of the former actuates rocking movement of the latter, and a saddle superposed on said support.

5. In combination, a vehicle running gear, a rocking horse disposed over said running gear, a yoke-like support carried by said running gear and disposed in straddling relation to said horse and having the latter pivotally mounted thereon, means whereby travel of said running gear induces rocking movement of said horse, and a rider's seat stationarily carried by said support at a distance from the back of the horse, said running gear and saddle being located to permit unobstructed rocking movement of the horse.

In testimony whereof, I affix my signature.

ELMER HOFF.